United States Patent Office 2,763,989
Patented Sept. 25, 1956

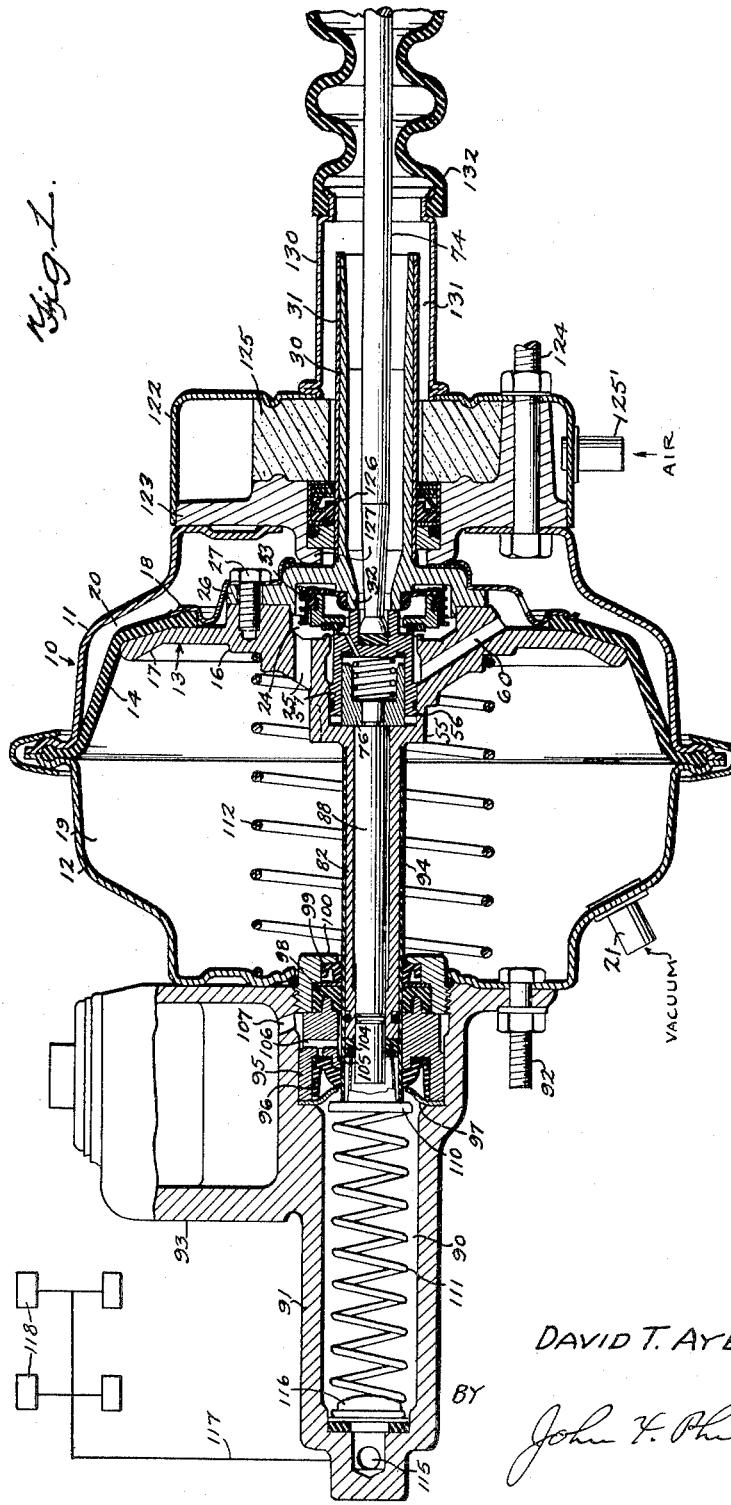

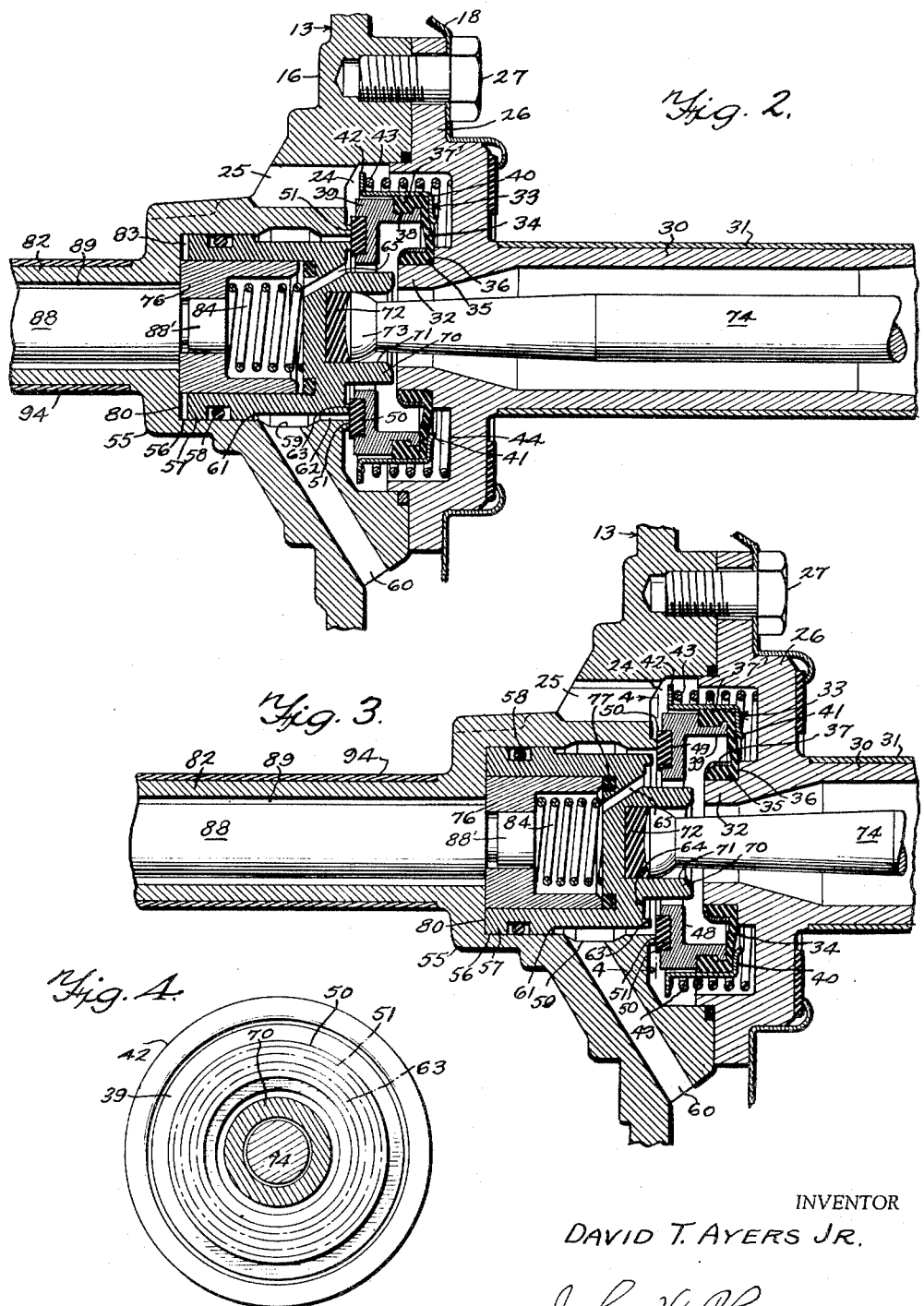

2,763,989

BOOSTER BRAKE MECHANISM

David T. Ayers, Jr., Birmingham, Mich., assignor to Kelsey Hayes Wheel Company, Detroit, Mich., a corporation of Delaware Application November 3, 1952, Serial No. 318,497

19 Claims. (Cl. 60—54.6)

This invention relates to booster brake mechanism, and particularly to a pressure-balanced valve mechanism and associated elements for controlling booster brake mechanism.

It is becoming increasingly common practice in booster brake mechanisms to eliminate the conventional master cylinder and to directly utilize movements of the brake pedal for assisting in displacing into the brake lines hydraulic brake fluid from a chamber from which fluid is also displaced by the follow-up operation of a motor controlled by the manually operable elements associated with the brake pedal. Apparatus of this type has reached a relatively high degree of perfection, but it still leaves something to be desired from the standpoint of the operation of the control valve mechanism for the booster brake mechanism.

In controlling the differential fluid pressures utilized for energizing the booster motor, it is highly desirable to render the movable parts of the valve mechanism readily movable from any position with the least possible resistance due to fluid pressures, the valves of such mechanisms having a tendency to stick and otherwise resist movements of the parts.

In a mechanism of this character, substantial experience in the development and testing of the mechanism has indicated that it is desirable in initial movements of the brake pedal from "off" position to minimize resistance to such movement, since such initial movements of the brake pedal do not accomplish any actual brake application, and resistances to movement are therefore false resistances and therefore undesirable.

These false resistances in mechanisms of this type usually arise from two sources, namely, the resistance to initial manual movement of the elements by transmitting such movement directly to the manually operable fluid displacing element which moves into the pressure chamber, and resistance to movement of the valve mechanism of the booster motor from its normally "off" position.

In the copending application of Jeannot G. Ingres and David T. Ayers, Jr., filed November 3, 1952, Serial No. 318,496, there is disclosed a novel form of connection between the manually operable rod connected to the brake pedal and the manually operable fluid displacing rod whereby initial movements of the former are utilized for operating the valve mechanism of the booster motor without imparting any movement or substantial force to the fluid displacing rod, thus minimizing the initial force necessary to operate the brake pedal and start the operation of the booster motor. Such mechanism is disclosed but not claimed in the present application.

An important object of the present invention is to provide a novel booster brake mechanism having a substantially pressure balanced control valve mechanism for the motor of a booster brake mechanism, thus smoothing out the operation of the apparatus, particularly from the standpoint of reducing the force necessary for initially moving the brake pedal away from its normal "off" position.

A further object is to provide such a mechanism wherein the valve structure is annular and surrounds the axis of the booster motor while being carried by the pressure movable unit thereof, the characteristics of the valve and its mounting relative to the pressure movable unit being such as to provide for relatively free movement of the valve device, thus rendering the pressure-balancing of the parts more effective in reducing forces necessary for the operation of the valve mechanism.

A further object is to provide such a device wherein the valve comprises an annular valve body supported with respect to the pressure movable unit by flexible means which permits movements of the valve to take place with limited resistance.

A further object is to provide such a valve mechanism in novel combination with a mechanism of the type disclosed in the copending application referred to above, wherein the two mechanisms combine to provide unexpectedly smooth initial brake operations with limited forces necessary for the movements of the parts.

Other objects and advantages of the invention will become apparent during the course of the following description.

In the drawings I have shown one embodiment of the invention. In this showing:

Fig. 1 is a longitudinal sectional view through a booster brake mechanism embodying the invention, parts being broken away and parts being shown in elevation, and the brake cylinders being diagrammatically represented;

Fig. 2 is an enlarged fragmentary sectional view through a valve mechanism for the booster, showing the valve parts in lap position;

Fig. 3 is a similar view showing the valve mechanism in the extreme booster motor energizing position; and Fig. 4 is a detail sectional view on line 4—4 of Fig. 3, omitting the fluid responsive unit surrounding the valve mechanism.

A complete operative booster brake mechanism is illustrated in Fig. 1, except for the mechanical connection of the manually operable member to the brake pedal of the motor vehicle. This connection is conventional, as will become apparent. Referring to Fig. 1, the numeral 10 designates a booster motor as a whole, comprising casing sections 11 and 12 in which is arranged a differential pressure responsive unit indicated as a whole by the numeral 13. This unit comprises a radially outer annular diaphragm 14 having its peripheral portion clamped between the casing sections 11 and 12 in a conventional manner.

The pressure movable unit 13 further comprises a preferably cast body 16 having an annular flange portion 17 engaging the diaphragm 14 as shown, the diaphragm being maintained in position by an annular clamping plate 18. The pressure responsive unit divides the motor into a pair of chambers 19 and 20, the former of which is connected by a suitable fitting 21 and conventional piping to the intake manifold of the motor vehicle engine where vacuum is used as the source of pressure differential. Under such conditions the chamber 19 may be considered as a constant pressure chamber and the chamber 20 as a variable pressure chamber, the pressure in the latter chamber being controlled by a novel valve mechanism forming one of the principal features of the present invention.

The body 16 of the pressure movable unit 13 is provided with an annular chamber 24 in fixed communication through a passage 25 with the motor chamber 19. A preferably cast cover plate 26 is fixed as at 27 to the body 16 at the side thereof opposite the passage 25, and the securing means 27 maintains the clamping plate 18 in position, as will be obvious. The cover plate 26 is provided with a preferably integral sleeve 30 (Figs. 1, 2, and 3) projecting toward the right as shown in Fig. 1, and this sleeve is preferably surrounded by a thin bearing sleeve 31, preferably formed of stainless steel to provide a smooth working surface, as will be apparent.

As more clearly shown in Figs. 2 and 3, the cover plate 26 is provided with an annular flange 32 projecting into the chamber 24. This flange supports a valve mechanism indicated as a whole by the numeral 33. The valve mechanism comprises a flexible diaphragm 34 having an inner hub portion 35 surrounding the flange 32 and seating against a shoulder 36 at the right-hand end thereof, and the hub of the diaphragm 35 is maintained in position by a pressed-on sheet metal retaining ring 37.

The diaphragm 34 is provided at its radially outer extremity with a longitudinally extending flange 37' engaging a groove 38 formed in a valve body 39. The peripheral portion of the diaphragm 34 is maintained in position by a pressed-on sheet metal sleeve 40. The right-hand end of the sleeve 40, as viewed in Figs. 2 and 3, is provided with an internal flange 41 engaging the diaphragm 34 to prevent any displacement of the diaphragm portion 37 toward the right in Figs. 2 and 3 under the influence of atmospheric pressure within the valve body under conditions to be described. The opposite end of the retaining sleeve 40 is provided with an outstanding annular flange 42 forming a seat engageable by one end of a compression spring 43. It will be noted that the cover plate 26 has a recess portion 44 forming a part of the valve chamber 24, and the opposite end of the spring 43 seats against the end wall of this recess. The spring 43 thus urges the valve 33 toward the left as viewed in Figs. 2 and 3. Since this is the only work which the spring 43 is called upon to perform, such spring may be, and preferably is, relatively lightly tensioned.

The valve body 39 has a radially inwardly extending wall 48 provided with an annular groove 49 in which is arranged a resilient valve 50 having a flat face projecting beyond the wall 48 to the left thereof for operative engagement with valve seats to be referred to. One of these valve seats is indicated by the numeral 51. Such seat is annular, as indicated in broken lines in Fig. 4, and is formed integral with the body 16 of the pressure movable unit. This valve seat projects slightly beyond the adjacent face of the chamber 24 and is arranged radially inwardly of the passage 25.

The body 16 of the pressure movable unit further comprises a hub portion 55 forming a cylinder 56 in which is slidably arranged a sleeve 57 sealed against leakage at its left-hand end, as viewed in Figs. 2 and 3, preferably by means of an O-ring 58. To the right of this O-ring the cylinder 56 is provided with an annular groove 59 communicating with a passage 60 leading into the variable pressure chamber 20 of the motor. To the left of the groove 59, the sleeve 57 is shouldered as at 61 to form a pressure surface for a purpose to be described. From this shoulder to the right-hand end thereof, the sleeve 57 is of reduced external diameter, forming an annular space 62 between this sleeve and the wall of the cylinder 56, and the sleeve 57 at the right-hand end terminates in an annular valve seat 63 engageable with the valve 50. The valve seat 63 extends to the right beyond the adjacent right-hand end portion of the sleeve 57 to provide an annular space 64, and this space communicates with the interior of the sleeve 57 through a passage 65, for a purpose to be described.

Radially inwardly of the valve seat 63, the sleeve 57 is provided with an axial extension 70 forming an axial recess 71 in the bottom of which is arranged a resilient disk 72. This disk is engageable by a head 73 formed on the end of a rod 74, the other end of which has mechanical connection in any suitable manner with the brake pedal of the motor vehicle. It will be apparent that depression of the brake pedal moves the manually operable rod 74 to the left in Figs. 1, 2, and 3 to perform the functions referred to in detail below.

Within the sleeve 57 is arranged a cup-shaped sleeve 76, the right end of which is open to the interior of the sleeve 57. The sleeve 57 may be provided with a resilient cushion 77 engageable, under conditions referred to, by the right end of the cup 76.

The hub 55 is provided at the left end of the cylinder 56 with a shoulder surface 80 against which the sleeve 76 is in constant, but not leakproof, engagement. The outer surface of the cup sleeve 76 is in slidable, but not sealing, engagement with the inner surface of the sleeve 57. It will become apparent below that atmospheric pressure is always present within the cup sleeve 76 through the passage 65, and air seeps between the sleeves 57 and 76, around the left end of the cup sleeve 76 and thence into the interior of an elongated axial sleeve 82, preferably formed integral with the body 16. In this connection, it will be noted that when the parts are in the "off" positions shown in Fig. 1, movement of the sleeve 57 toward the right is limited by engagement of the flange 70 with the flange 32, but these flanges are not in sealing engagement with each other and the maintenance of atmospheric pressure in the interior of the sleeve 82, accordingly, is not affected.

The sleeve 57 has its left end spaced from the shoulder surface 80 in all positions of the parts, except under the extreme brake operating conditions shown in Fig. 3, in which case the sleeve 57 is moved the extreme distance to the left, at which time the right extremity of the cup sleeve 76 engages the cushion 77. Therefore it may be considered that there is normally an operating space 83 to the left of the sleeve 57, whereas the sleeve 76 is always in engagement with the shoulder surface 80. Thus, movement of the manually operable rod 74, except as referred to below, moves the sleeve 57 but does not transmit any positive force to the sleeve 76 or to the body 16 of the pressure movable unit. To tend to maintain the normal relative positions of the parts, a spring 84 engages at opposite ends against the sleeves 57 and 76. This spring is relatively weak but is stronger than, and normally overcomes the tension of, the spring 43 to tend normally to hold the valve parts in the "off" positions shown in Fig. 1. The force exerted by the spring 84 to tend to move the rod 74 toward the right, therefore, may be considered generally to be its own tension minus the tension of the spring 43, and the net force need be sufficient only to maintain the manually operable parts, including the brake pedal, in normal positions.

A plunger rod 88 is arranged within the sleeve 82. The rod 88 is provided with a head 88' fitted within the sleeve 76. The plunger rod is of slightly smaller diameter than the interior of the sleeve 82 to provide a space 89 in which atmospheric pressure will always be present for the reasons stated above. The elements forming the means for connecting the rods 74 and 88 and for utilizing movements of the former independently of the latter to control broadly any type of motor control valve mechanism, including sleeves 57 and 76, spring 84 and the engagement of the sleeve 76 against the shoulder 80, form no part of the present invention except in combination with the novel type of control valve mechanism referred to.

The sleeve 82 and plunger 88 constitute a fluid displacing unit for moving hydraulic fluid from a chamber 90 formed in a body 91 fixed as at 92 to the casing section 12. The body 91 preferably includes a reservoir 93, the present construction, as will be apparent, being a complete operating entity in itself without the use of the usual hydraulic brake master cylinder. The sleeve 82 is preferably surrounded by a stainless steel sleeve 94, which provides a smooth operating surface of minimum friction for the operation of the sleeve 94 through a bearing 95 having a seal 96 of the double-lipped type arranged therein and held in position by a retainer 97.

To the right of the bearing 95, seals 98 and 99 surround the sleeve 94 and are held in position by a retainer 100 threaded into the body 91.

The sleeve 94 extends substantially beyond the sleeve 82, and between these members is arranged a double-lipped seal 104 to the left of which the sleeve 94 is provided with a port 105 communicating with the reservoir 93 through a passage 106 in the bearing 95 and a port 107 formed in the bottom of the reservoir 93. The structure at the left end of the fluid-displacing unit forms no part of the present invention but is described and claimed in my copending application Serial No. 318,495, filed November 3, 1952.

A seat 110 engages the left end of the sleeve 94, and a spring 111 has one end engaging this seat to tend to maintain the parts normally in an "off" position. This spring is assisted by the usual return spring 112 arranged in the motor chamber 19 and engaging at opposite ends against the casing section 12 and the body 16 of the pressure movable unit 13.

At its left end, the chamber 90 is provided with an outlet opening 115 the flow of fluid through which is controlled in the usual manner by a residual pressure valve 116. The outlet 115 is connected to the brake lines 117 to supply hydraulic fluid to the wheel cylinders 118.

Any suitable means may be provided for supporting the sleeves 30 and 31 for reciprocation. This means is preferably as shown in Fig. 1 and forms, per se, no part of the present invention. An air cleaner 122 has its body 123 fixed as at 124 to the casing section 11 and carries an air cleaning unit 125 through which air flows from the atmosphere through a suitable inlet 125'. Any suitable bearing and sealing means, indicated generally by the numeral 126, is carried by the air cleaner body 123 and slidably engages the sleeve 31. The air cleaner body 123 has a shoulder 127 acting as a stop means to limit movement of the pressure movable unit 13 to the right to the "off" position shown in Fig. 1.

A sleeve 130 is carried by and projects to the right from the air cleaner and is of larger diameter than the sleeve 31 to form therewith an annular space 131 with which the right-hand open end of the sleeve 30 communicates. The usual dust excluding boot 132 is connected at its left end to the sleeve 130.

*Operation*

The parts of the device normally occupy the "off" positions shown in Fig. 1, in which the case the valve seat 63 engages the valve 50, but the valve seat 51 is spaced from the valve 50. Accordingly, the motor chamber 19, which is in constant communication with the source of vacuum, communicates with the motor chamber 20 through passage 25, chamber 24, annular space 62 and passage 60, and the motor thus is normally vacuum suspended.

Assuming that the brakes are to be applied, the operator will depress the brake pedal, thus moving the rod 74 to the left as viewed in Figs. 1, 2, and 3. Inasmuch as the following references to movements of the parts to the right or left will be applicable to Figs. 1, 2, and 3 only, it is believed unnecessary to further refer to such movements with respect to any particular figure or figures. Movement of the rod 74 to the left imparts similar movement to the sleeve 57, and since there is play between this sleeve and the sleeve 76 and the body 16, the initial movement of the rod 74 encounters, aside from negligible friction, only the resistance of the spring 84 minus the resistance of the valve spring 43. The valve device is substantially pressure balanced as described below, and fluid pressures have negligible effect on the functioning of the springs 43 and 84.

Thus, very light initial pressure on the pedal is required, this pressure being not in excess of 5 pounds. In this connection, it is pointed out that prior constructions of this type have directly transmitted movement between rods corresponding to the rods 74 and 88 so that the latter is moved at all times with the rod 74. Initial movement of rods corresponding to the rod 74 would encounter two resistances, namely, spring means interposed between the rod 74 and the pressure movable unit of the motor, and the resistance to movement of the fluid-displacing rod entering the hydraulic chamber. The latter resistance was due largely to the force required for opening the residual pressure valve.

Thus, in prior constructions of this particular type, initial movement of the brake pedal would encounter resistances which bore no relation whatever to the force of application of the brake shoes to the brake drums, since there is no contact between the latter elements upon initial movement of the brake pedal from the fully "off" position. These mechanisms, accordingly, were slightly sluggish in initial operations of the parts and provided the brake pedal with a false and somewhat undesirable "feel."

Relatively slight movement of the rod 74 to the left against the slight resistance referred to moves the inner valve seat 63 to the left and the valve 50 will follow this seat under the influence of the spring 43 until the lap position of the valves is reached, as in Fig. 2. Both valve seats 51 and 63 will then contact the valve 50 and the closing of the valve at the seat 51 cuts off communication between the motor chambers 19 and 20. At this time approximately only half the normal space 83 will have been taken up and the rod 74 is still free to move without positively transmitting movement to the fluid displacing rod 88.

Slight further movement of the rod 74 to the left disengages the seat 63 from the valve 50, but not to the extreme extent shown in Fig. 3. Movement of the valve 50 to the left will be arrested by the valve seat 51 and hence the valve seat 63 will move away from the valve 50. Air will then flow through the air cleaner 122 (Fig. 1), sleeve 130, thence through sleeve 30 through the interior of the valve 33, around the valve 63, through space 62 and then through passage 60 into the motor chamber 20. The pressure in chamber 20 thus will increase, and differential pressure will move the unit 13 to the left to carry with it the sleeve 82 to displace fluid from the chamber 90 past the residual pressure valve 116 and into the brake lines. The follow-up action of the valve mechanism is quite accurate and thus the plunger rod 88 will move to the left with the sleeve 82, but the greater effective area of the sleeves 82 and 94 will perform the greater part of the work in building up pressure in the chamber 90 to displace fluid therefrom. Movement of the plunger 88 upon initial movement of the plunger 74 would have placed upon the plunger 88 all of the burden of displacing fluid from the chamber 90 while operating the valve mechanism to energize the motor. Therefore, no fluid is displaced from the chamber 90 until the motor 10 actually starts to operate, instead of the usual operation wherein fluid is first displaced by the rod 88 followed by energization of the motor 10.

Depending upon the design of the system as a whole and the particular vehicle on which the present device is used, a later pressure in the chamber 90 will be reached in which the sleeve 57 tends to move further to the left while pressure in the chamber 90 increases resistance to movement of the rod 88. Prior to the taking up of all of the play in the space 83 (Fig. 2), the resistance to movement of the rod 88 will have relatively moved the cup sleeve 76 to its limit toward the right to bring the end of this cup into engagement with the cushion 77. From this point on in the further application of the brakes, the spring 84 becomes ineffective and a direct connection is established between rods 74 and 88 and the operator "feels" through the brake pedal a resistance which is proportional to the pressure in the chamber 90.

In the operation of most brakes, the operation of the brake pedal to effect a substantial brake application can result in only a given energization of the motor 10. As motor energization progresses, the rate of increased motor energization progressively decreases with respect to the rate of movement of the rod 74, and accordingly during such operation the space 83 (Fig. 2) may be completely taken up. Under some conditions, therefore, a full and rapid brake application results in a full opening of the air valve 63 and the taking up of all the play between the manually operable and motor operable parts, in which case the sleeve 57 will move into solid contact with the shoulder surface 80. The parts will then assume the positions shown in Fig. 3, and the rods 74 and 88 will move as a unit with the pressure movable unit 13. This condition will exist under varying conditions in different vehicles according to individual designs and may occur, for example, at a pedal pressure of from 50 to 80 pounds. Wherever this point occurs, the parts will remain as shown in Fig. 3 through any further depression of the brake pedal, and if necessary, therefore, pressure on the foot pedal may assist the motor in displacing fluid from the chamber 90. Of course, in the event of a failure of power in the motor 10, operation of the pedal will take up all play between the parts as shown in Fig. 3, and the brakes will be wholly manually applied.

Upon the releasing of the brake pedal, the manually operable parts will move toward the right and the spring 84 will again exert its force to bring the valve parts to the lap position in Fig. 2 and then to the "off" position shown in Fig. 1, whereupon the air valve 63 will be closed and the vacuum valve 51 will be opened and the motor again will be vacuum suspended.

Particular attention is also invited to the fact that the present construction provides a balanced valve arrangement, as closely as balanced pressure conditions can be approximated, and accordingly the valve elements are freely operable without any tendency to stick or otherwise resist movement away from any given position. Air pressure is always present within the valve body 39 and acts equally, so fas as pressure is concerned, against the inner face of the valve wall 48 and the inner face of the diaphragm 34. Since vacuum is present outwardly of the diaphragm 34, the substantially radial portion of this diaphragm will be moved out of tight engagement with the adjacent end of the valve body 39 and substantially equal areas will be presented to atmospheric pressure.

This atmospheric pressure is opposed by the presence of vacuum at certain faces of the valve mechanism. There will be vacuum present to the right of the diaphragm 34, but there also will be an almost balancing vacuum affecting the left side of the valve mechanism radially outwardly of the air valve seat 63 when the parts are in the normal "off" positions. Therefore the valve will be substantially pressure balanced. The total area acted upon by the vacuum is greater in the "off" positions of the parts, as in Fig. 1, than in the fully brake-applied positions of the parts, as in Fig. 3, the left valve surfaces exposed to vacuum being then entirely radially outwardly of the seat 51.

It has been found that the operating characteristics of the valve are improved by employing in conjunction with the valve a further variable pressure surface, hence the use of the surface 61 of the cup sleeve 57. When the parts are in the "off" position, the surface 61 is exposed to vacuum while atmospheric pressure is present in the space 83 through the use of the seal 58 and the seepage of air around the cup sleeve 76. In the positions of the parts shown in Fig. 1, therefore, there is a slightly greater tendency of effective fluid pressures to keep the valve in "off" position. This tends to prevent any accidental valve operation under the influence of any movements of the vehicle. When the brake is applied, however, atmospheric pressure entering the space 62 subjects the surface 61 to air pressure, and this relieves any tendency for differential pressures to resist brake applying movements of the sleeve 57 and at the same time reduces the vacuum-exposed surfaces of the valve mechanism tending to move such mechanism toward the right. Under such conditions, the spring 43 will be wholly depended upon to maintain the valve mechanism in the position shown in Fig. 3.

From the foregoing it will be apparent that the present construction provides a highly improved valve mechanism which functions smoothly and accurately to provide a follow-up action of the sleeve 82 relative to the rod 88, the valve being always readily movable out of any given position in accordance with brake pedal operation. It also will be apparent that the mechanism smooths out the initial operation of the brake pedal by relieving the pedal of any necessity for having to displace fluid from the chamber 90 ahead of energization of the motor 10. Thus, initial sluggishness and the presence in the brake pedal of an artificial "feel" are eliminated.

It particularly will be noted that the valve device is connected to and wholly supported by the pressure movable unit of the motor and the connecting and supporting of the valve device is accomplished solely through the flexible diaphragm wall 34. This flexible wall offers negligible resistance to the relative bodily shifting of the valve device, which obviously functions through relative movements of the pressure movable unit of the motor and the manually operable elements controlled by the brake pedal. Accordingly, the valve device in its functioning is controlled substantially solely by the forces of the springs 43 and 84 and the relative positions of the parts.

The lost motion connection between the rods 74 and 88, through the sleeves 57 and 76, forms no part, per se, of the present invention but is disclosed and claimed in the copending application of Jeannot G. Ingres and David T. Ayers, Serial No. 318,496, filed November 3, 1952. It has been found, however, that the pressure balanced valve mechanism described above functions with particular smoothness and accuracy in combination with the lost motion means referred to. As previously stated, the valve parts are held in their normal "off" positions by a force equal to the difference between the forces of the spring 43 and the spring 84 of the lost motion device referred to. The lost motion device, accordingly, minimizes the force required for initially moving the rod 74 by the brake pedal and, therefore, provides for a quick, smooth, and substantially effortless initial functioning of the valve mechanism, as is highly desirable. Moreover, the surface 61 of the sleeve 57, which sleeve forms a part of the lost motion connection, is a variable pressure surface which assists in the smooth functioning of the valve mechanism as described above.

I claim:

1. A booster brake mechanism comprising a hydraulic fluid chamber having an outlet adapted for connection with the brakes of a vehicle, a manually operable rod and a surrounding power operable sleeve movable into said chamber to displace fluid therefrom, a manually operable unit for operating said rod, a fluid pressure motor having a casing and a pressure movable unit therein dividing said casing to form a constant pressure chamber and a variable pressure chamber, said pressure movable unit being connected to said sleeve and having an internal recess in fixed communication with said constant pressure chamber, and a valve mechanism in said recess for controlling said motor, said valve mechanism comprising an annular valve body flexibly supported by said manually operable unit and provided with an annular valve element, a pair of annular valve seats engageable with said valve element, one seat being formed on said pressure operable unit and projecting into said recess and the other seat being concentric with said one seat and carried by said manually operable unit and projecting into said recess, resilient means urging said valve element toward said seats, and stronger resilient means urging said manually operable unit toward a normal "off" position whereby, in the absence of a force applied to said manually operable unit, said stronger resilient means engages said other valve seat against said valve element and moves the latter away from said first valve seat against the tension of said first-named resilient means.

2. A booster brake mechanism constructed in accordance with claim 1, provided with a flexible diaphragm flexibly supporting said valve body, said diaphragm being connected to said valve body and to said pressure movable unit.

3. A booster brake mechanism constructed in accordance with claim 1, provided with a flexible diaphragm flexibly supporting said valve body, said diaphragm being connected to said valve body and to said pressure movable unit, said valve body and said flexible diaphragm forming a chamber communicating with a source of pressure.

4. A booster brake mechanism constructed in accordance with claim 1, provided with a flexible diaphragm flexibly supporting said valve body, said diaphragm being connected to said valve body and to said pressure movable unit, said valve body and said flexible diaphragm forming a chamber communicating with a source of pressure, said valve body and said flexible diaphragm having faces of approximately equal areas subject respectively to pressures in said recess and in said chamber, whereby differential pressures in said recess and in said last-named chamber exert negligible force tending to move said valve body longitudinally of the axis of said rod.

5. A booster brake mechanism comprising a hydraulic fluid chamber having an outlet adapted for connection with the brakes of a vehicle, a manually operable rod and a surrounding power operable sleeve movable into said chamber to displace fluid therefrom, a manually operable unit for operating said rod, a fluid pressure motor having a casing and a pressure movable unit therein dividing said casing to form a constant pressure chamber and a variable pressure chamber, said pressure movable unit being connected to said sleeve and having an internal recess in fixed communication with said constant pressure chamber, and a valve mechanism arranged in said recess. said valve mechanism comprising an annular valve body having a surrounding wall and a wall perpendicular to the axis of said rod, a resilient valve element carried by said perpendicular wall, said pressure movable unit within said recess having an annular shoulder, a flexible diaphragm having its radially inner portion surrounding said shoulder and having its radially outer portion connected to the surrounding wall of said valve body to form resilient means supporting said valve body in said recess, a first annular valve seat carried by said pressure movable unit and projecting into said recess and concentric with said valve element, a second annular valve seat carried by said manually operable unit within and spaced from said first valve seat and concentric with said valve element for engagement therewith, the space between said valve seats being in fixed communication with said variable pressure chamber, and oppositely acting resilient means urging said valve body longitudinally of the axis of said rod and having a net force biasing said second valve seat into engagement with said valve element to move such element away from said first valve seat in the absence of a force acting on said manually operable unit to move the latter against said net force, there being a space within said second valve seat in fixed communication with a source of pressure.

6. A booster brake mechanism comprising a hydraulic fluid chamber having an outlet adapted for connection with the brakes of a vehicle, a manually operable rod and a surrounding power operable sleeve movable into said chamber to displace fluid therefrom, a manually operable unit for operating said rod, a fluid pressure motor having a casing and a pressure movable unit therein dividing said casing to form a constant pressure chamber and a variable pressure chamber, said pressure movable unit being connected to said sleeve and having an internal recess in fixed communication with said constant pressure chamber, and a valve mechanism arranged in said recess, said valve mechanism comprising an annular valve body having a surrounding wall and a wall perpendicular to the axis of said rod, a resilient valve element carried by said perpendicular wall, said pressure movable unit within said recess having an annular shoulder, a flexible diaphragm having its radially inner portion surrounding said shoulder and having its radially outer portion connected to the surrounding wall of said valve body to form resilient means supporting said valve body in said recess, a first annular valve seat carried by said pressure movable unit and projecting into said recess and concentric with said valve element, a second annular valve seat carried by said manually operable unit within and spaced from said first valve seat and concentric with said valve element for engagement therewith, the space between said valve seats being in fixed communication with said variable pressure chamber, an annular spring seat surrounding the radially outer portion of said diaphragm to retain it in position, a spring engaging said seat to urge said valve body and said valve element toward said valve seats, and a stronger spring engaging said manually operable unit to tend to move it in the opposite direction to engage said second valve seat with said valve element and move the latter away from said first valve seat in the absence of a force applied to said manually operable unit acting against said second spring, there being a space within said second valve seat in fixed communication with a source of pressure.

7. A booster brake mechanism comprising a hydraulic fluid chamber having an outlet adapted for connection with the brakes of a vehicle, a manually operable rod and a surrounding power operable sleeve movable into said chamber to displace fluid therefrom, a manually operable unit for operating said rod, a fluid pressure motor having a casing and a pressure movable unit therein dividing said casing to form a constant pressure chamber and a variable pressure chamber, said pressure movable unit being connected to said sleeve and having an internal recess in fixed communication with said constant pressure chamber, and a valve mechanism arranged in said recess, said valve mechanism comprising an annular valve body having a surrounding wall and a wall perpendicular to the axis of said rod, a resilient valve element carried by said perpendicular wall, said pressure movable unit within said recess having an annular shoulder, a flexible diaphragm having its radially inner portion surrounding said shoulder and having its radially outer portion connected to the surrounding wall of said valve body to form resilient means supporting said valve body in said recess, a first annular valve seat carried by said pressure movable unit and projecting into said recess and concentric with said valve element, a second annular valve seat carried by said manually operable unit within and spaced from said first valve seat and concentric with said valve element for engagement therewith, the space between said valve seats being in fixed communication with said variable pressure chamber, an annular spring seat surrounding the radially outer portion of said diaphragm to retain it in position, a spring engaging said seat to urge said valve body and said valve element toward said valve seats, and a stronger spring engaging said manually operable unit to tend to move it in the opposite direction to engage said second valve seat with said valve element and move the latter away from said first valve seat in the absence of a force applied to said manually operable unit acting against said second spring, said valve body and said resilient diaphragm forming an annular chamber communicating with a source of pressure, there being an annular space within said second valve seat in fixed communication with said annular chamber.

8. A booster brake mechanism comprising a hydraulic fluid chamber having an outlet adapted for connection with the brakes of a vehicle, a fluid-displacing rod and a surrounding fluid-displacing sleeve movable into said chamber to displace fluid therefrom, a manually operable element having a normal "off" position and provided in such position with lost motion connection with said fluid-displacing rod, a spring interposed between said fluid-displacing rod and said manually operable element, a differential fluid pressure operated motor having a pressure responsive unit connected to said sleeve, and a follow-up control valve mechanism for said motor, said valve mechanism comprising a valve device within said pressure movable unit and having an annular valve element, said avlve mechanism further comprising a pair of concentric valve seats one carried by said pressure movable unit and the other mechanically connected to said manually operable element whereby, upon movement of said manually operable element from said "off" position through a predetermined distance of movement, said valve element will engage both seats to assume a lap position and from which position said other valve seat is further movable within the limits of the lost motion connection between said manually operable element and said fluid-displacing rod to move said other valve seat away from said valve element to energize said motor.

9. A booster brake mechanism comprising a hydraulic fluid chamber having an outlet adapted for connection with the brakes of a vehicle, a fluid-displacing rod movable into said fluid chamber, a differential fluid pressure operated motor having a pressure movable unit dividing it into a pair of pressure chambers, said pressure movable unit including a fluid-displacing sleeve surrounding said fluid-displacing rod to cooperate therewith in displacing fluid from said fluid chamber, said pressure movable unit being provided with a cylindrical recess, inner and outer slidably connected coaxial sleeves mounted in said cylindrical recess, one of said coaxial sleeves being connected to said fluid displacing rod, a manually operable rod engaging the other coaxial sleeve, a spring interposed between said coaxial sleeves to urge them and their respective rods in opposite directions, said other coaxial sleeve having lost motion connection with said one coaxial sleeve, said manually operable rod having a normal "off" position from which it is movable against the tension of said spring to take up lost motion between said coaxial sleeves, a valve device in said pressure movable unit having an annular valve element, inner and outer annular seats engageable with said valve element, the outer seat being carried by said pressure movable unit and the inner seat by said other coaxial sleeve, said spring exerting a force against said valve element to release it from said outer seat under which condition said motor chambers communicate with each other, and a spring lighter than said first-named spring urging said valve device toward said other seat whereby, upon movement of said manually operable rod from its normal "off" position, said other valve seat moves in a direction away from said valve element and the latter moves into engagement with said one seat, further movement of said manually operable rod moving said other valve seat away from said valve element under which conditions one of said motor chambers is connected to a source of pressure.

10. Apparatus constructed in accordance with claim 9 wherein said other coaxial sleeve has lost motion relative to said pressure movable unit whereby, after lost motion between said coaxial sleeves is taken up, said rods, said coaxial sleeves and said pressure movable unit are bodily movable as a unit.

11. A booster brake mechanism comprising a hydraulic fluid chamber having an outlet adapted for connection with the brakes of a vehicle, a differential fluid pressure operated motor having a pressure movable unit dividing it into a pair of chambers one of which is a constant pressure chamber and the other of which is a variable pressure chamber, said pressure movable unit including a fluid-displacing sleeve projecting into said hydraulic fluid chamber, a fluid-displacing rod slidable coaxially in said fluid-displacing sleeve, a manually operable rod having mechanical connection with said fluid-displacing rod to effect movement thereof into said hydraulic fluid chamber, said manually operable rod having a normal "off" position, an annular valve seat connected to said manually operable rod, a radially outer annular valve seat carried by said pressure movable unit, and a valve device mounted in said pressure movable unit, said valve device comprising a flexible member connected at its radially inner edge to said pressure movable unit, a valve body connected to the radially outer portion of said flexible member and cooperating therewith to form an annular space therewithin communicating with a source of pressure, a first spring means urging said valve device towards said seats, and a second spring means urging said manually operable rod to its normal "off" position and normally overcoming the tension of said first spring means through engagement of said first named valve seat against said valve element to move the latter away from said second named seat under which conditions said motor chambers communicate with each other, movement of said manually operable rod from its "off" position freeing said first spring means for moving said valve element into engagement with said second named seat to disconnect said motor chambers from each other, said second named seat arresting movement of said valve element and further movement of said manually operable rod moving said first named seat out of engagement with said valve element to connect said source of pressure to said variable pressure chamber.

12. Apparatus constructed in accordance with claim 11, wherein said rods have lost motion connection with each other and said second spring is interposed between said rods to extend said lost motion connection when said manually operable rod is released, whereby said manually operable rod is movable to move said first seat relative to said valve element without transmitting positive moving forces to said fluid-displacing rod until said lost motion connection is taken up.

13. Apparatus constructed in accordance with claim 11 wherein said flexible member and said valve body have oppositely facing surfaces of substantially equal area subject to pressure in said source, said flexible member, and said valve body and the valve seat engaging surface of said valve element, having remote oppositely facing surfaces of substantially equal areas subject to pressure in said constant pressure chamber when said valve device is disengaged from said second valve seat.

14. Apparatus constructed in accordance with claim 11 provided with coaxial slidably connected sleeves carried respectively by said rods and the coaxial sleeve carried by said manually operable rod surrounding the other of such sleeves, the coaxial sleeve carried by said manually operable rod being provided with a pressure surface radially outwardly of said first named seat subject to pressure around such seat.

15. Apparatus constructed in accordance with claim 11 provided with coaxial slidably connected sleeves carried respectively by said rods and the coaxial sleeve carried by said manually operable rod surrounding the other of such sleeves, the coaxial sleeve carried by said manually operable rod being provided with a pressure surface radially outwardly of said first named seat subject to pressure around such seat, there being a lost motion connection between said coaxial sleeves, said second spring means urging said coaxial sleeves and their respective rods relatively away from each other whereby said manually operable rod is movable from its normal "off" position to move said first named valve seat relative to said valve element without transmitting positive movement to said fluid-displacing rod.

16. A booster brake mechanism comprising a hydraulic fluid chamber having an outlet for connection with the brakes of a vehicle, a fluid displacing unit movable into said chamber to displace fluid therefrom, a fluid motor having a casing and a pressure movable unit therein connected to said fluid displacing unit, a manually operable unit, a valve mechanism in said pressure movable unit for controlling said motor, said valve mechanism comprising an annular valve body, an annular flexible member supporting said valve body for movement relative to both said pressure movable unit and said manually operable unit, an annular valve element carried by said valve body, and a pair of annular valve seats engageable with said valve element, one seat being carried by said pressure movable unit and the other by said manually operable unit, and means biasing said valve element and said valve seats for relative movement to relative normal positions in which said valve element engages one of said seats to balance pressures in said motor, said manually operable unit being movable to release said one valve seat from said valve element and engage said valve element with the other valve seat to connect one end of said motor to a pressure source to actuate said pressure movable unit.

17. A booster brake mechanism comprising a hydraulic fluid chamber having an outlet for connection with the brakes of a vehicle, a fluid displacing unit movable into said chamber to displace fluid therefrom, a fluid motor having a casing and a pressure movable unit therein connected to said fluid displacing unit, a manually operable unit, said pressure movable unit and said manually operable unit having portions in axial sliding engagement whereby such units constitute a pair of relatively movable units, a valve mechanism in said pressure movable unit for controlling said motor, said valve mechanism comprising an annular valve body, an annular flexible member connected to one of said relatively movable units and supporting said valve body for movement relative to both of said units, an annular valve element carried by said valve body, and a pair of annular valve seats engageable with said valve element, one seat being carried by said pressure movable unit and the other by said manually operable unit, means biasing said valve element and said valve seats for relative movement to relative normal positions in which said valve element engages one of said valve seats to balance pressures in said motor, said manually operable unit being movable to release said one valve seat from said valve element and engage said valve element with the other valve seat to connect one end of said motor to a pressure source to actuate said pressure movable unit.

18. A booster brake mechanism comprising a hydraulic fluid chamber having an outlet for connection with the brakes of a vehicle, a fluid displacing unit movable into said chamber to displace fluid therefrom, a fluid motor having a casing and a pressure movable unit therein connected to said fluid displacing unit, a manually operable unit, a valve mechanism in said pressure movable unit for controlling said motor, said valve mechanism comprising an annular valve body, an annular flexible member supporting said valve body for movement relative to both said pressure movable unit and said manually operable unit and connected to one of such units, an annular valve element carried by said valve body, and a pair of coaxial radially spaced annular valve seats engageable with said valve element, one seat being carried by said pressure movable unit and the other by said manually operable unit, and means biasing said valve element and said valve seats for relative movement to relative normal positions in which said valve element engages one of said seats to balance pressures in said motor, said manually operable unit being movable to release said one valve seat from said valve element and to engage said valve element with the other valve seat to connect one end of said motor to a pressure source to actuate said pressure movable unit.

19. A booster brake mechanism comprising a hydraulic fluid chamber having an outlet for connection with the brakes of a vehicle, a fluid displacing unit movable into said chamber to displace fluid therefrom, a fluid motor having a casing and a pressure responsive unit therein connected to said fluid displacing unit, said pressure movable unit having an axial recess, a manually operable unit coaxial with said pressure movable unit, and a valve mechanism in said recess for controlling said motor, said valve mechanism comprising an annular valve body, an annular flexible member supporting said valve body for movement relative to both said pressure movable unit and said manually operable unit and connected to one of such units, an annular valve element carried by said valve body, and a pair of coaxial annular valve seats facing into said recess in spaced coaxial relationship, one seat being carried by said pressure movable unit and the other by said manually operable unit, and means biasing said valve element and said seats for relative movement to relative normal positions in which said valve element engages one of said seats to balance pressures in said motor, said manually operable unit being movable to release said one valve seat from said valve element and engage said valve element with the other valve seat to connect one end of said motor to a pressure source to actuate said pressure movable unit.

References Cited in the file of this patent

UNITED STATES PATENTS

| | | |
|---|---|---|
| 1,921,590 | Staude | Aug. 8, 1933 |
| 2,006,487 | Sorensen | July 2, 1935 |
| 2,165,942 | Rossmann | July 11, 1939 |
| 2,260,491 | Stelzer | Oct. 28, 1941 |
| 2,458,803 | Stelzer | Jan. 11, 1949 |